H. A. LEWIS.
ELECTRIC RAILWAY SYSTEM.
No. 506,124.  Patented Oct. 3, 1893.
4 Sheets—Sheet 1.
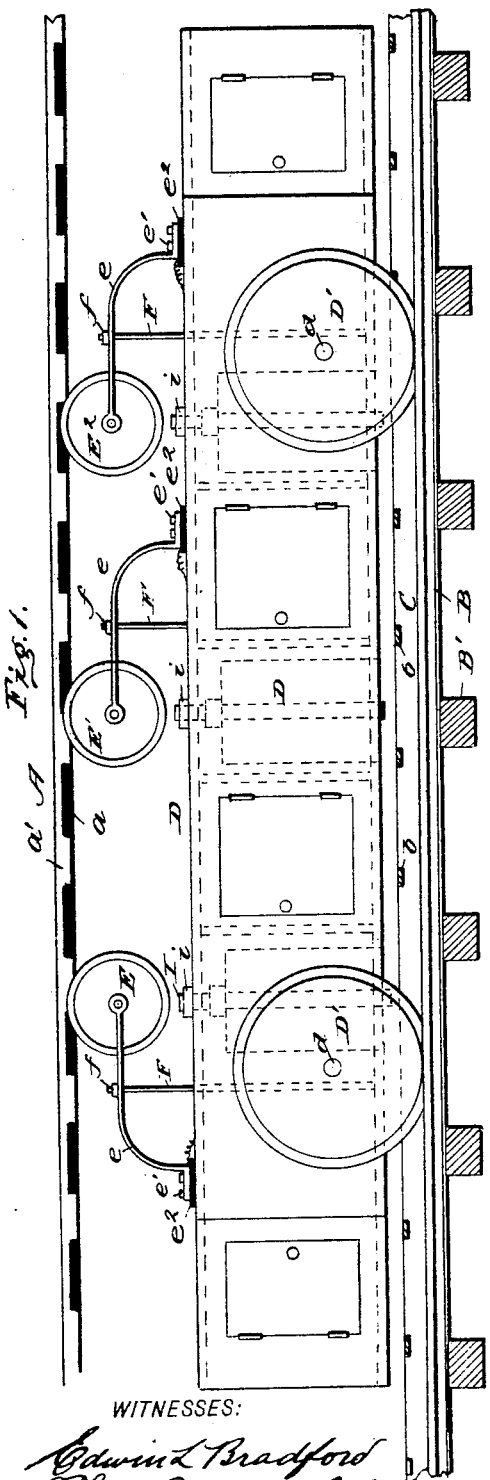
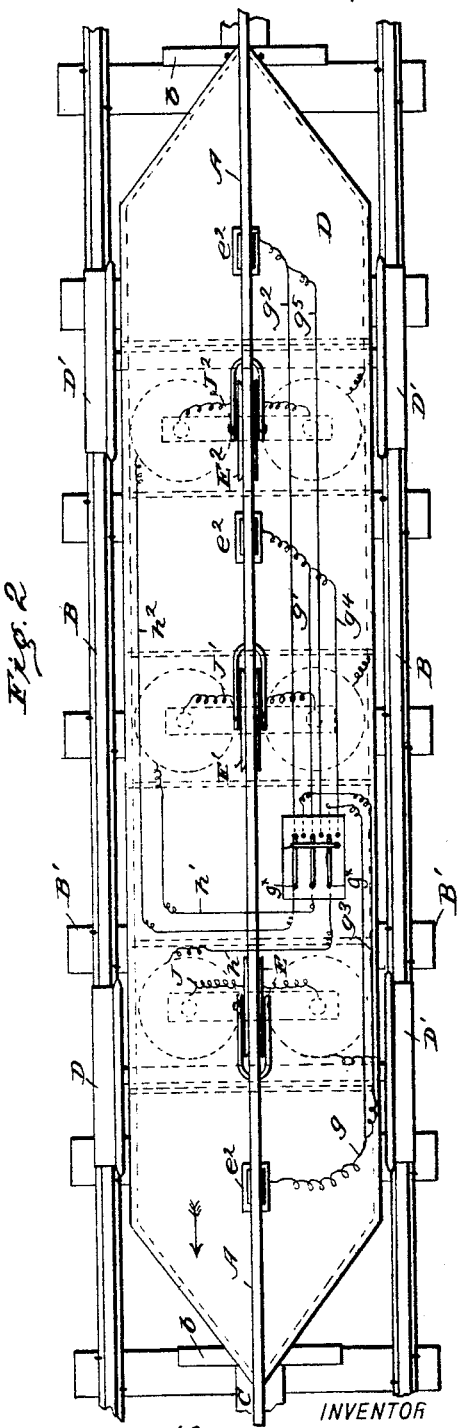
WITNESSES:
Edwin L. Bradford
Theo. L. Gatchel
INVENTOR
Harry A. Lewis,
BY
V. S. Stockbridge & Son.
ATTORNEYS.

H. A. LEWIS.
ELECTRIC RAILWAY SYSTEM.
No. 506,124. Patented Oct. 3, 1893.
4 Sheets—Sheet 2.
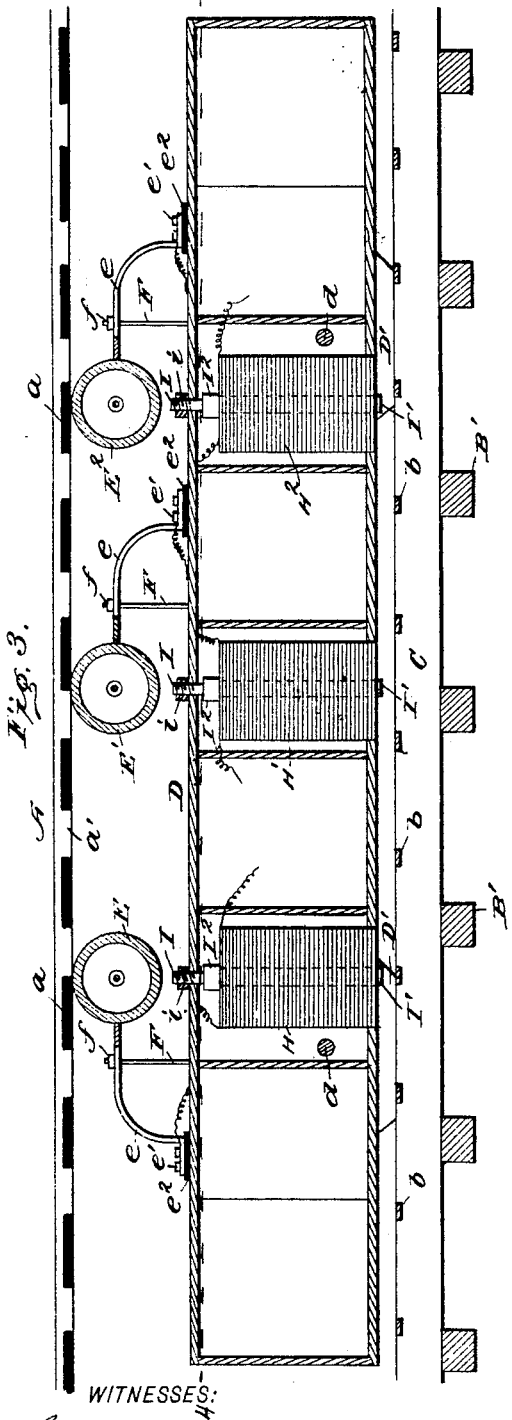
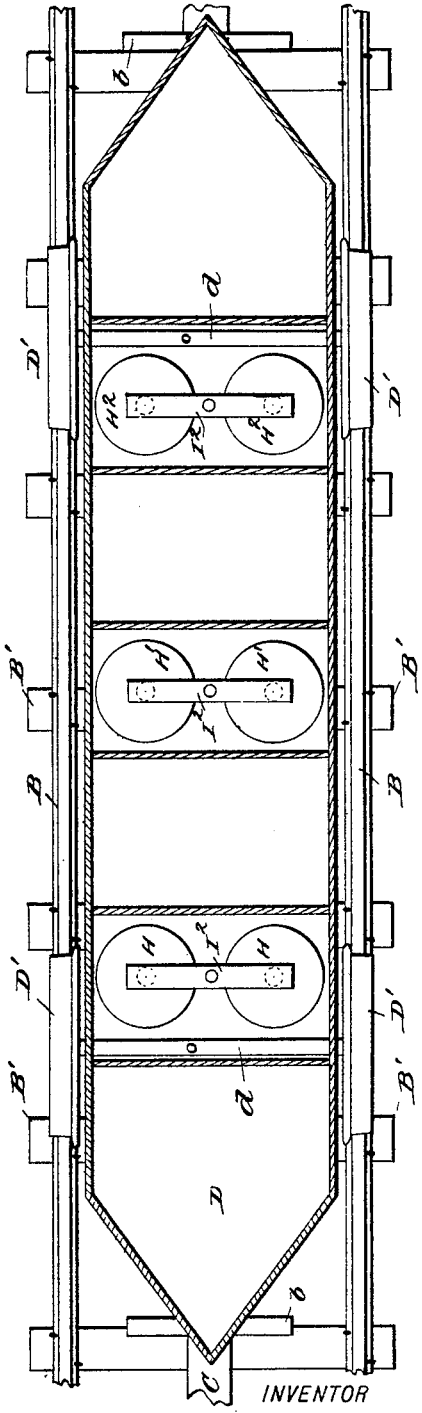
WITNESSES:
Edwin L. Bradford
Theo. F. Gatchel
INVENTOR
Harry A. Lewis
BY
V. D. Stockbridge & Son.
ATTORNEYS.

A. LEWIS.
ELECTRIC RAILWAY SYSTEM.
No. 506,124. Patented Oct. 3, 1893.
4 Sheets—Sheet 3.
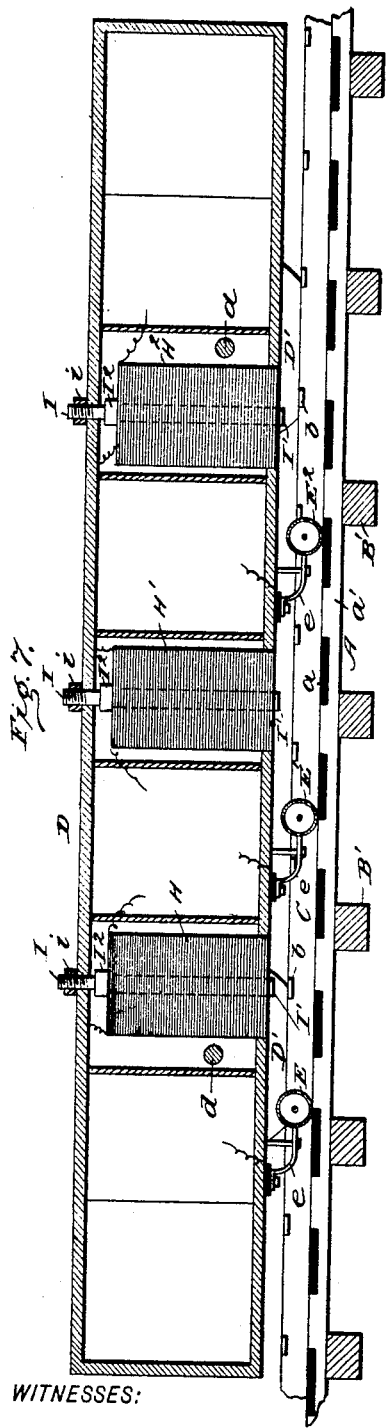
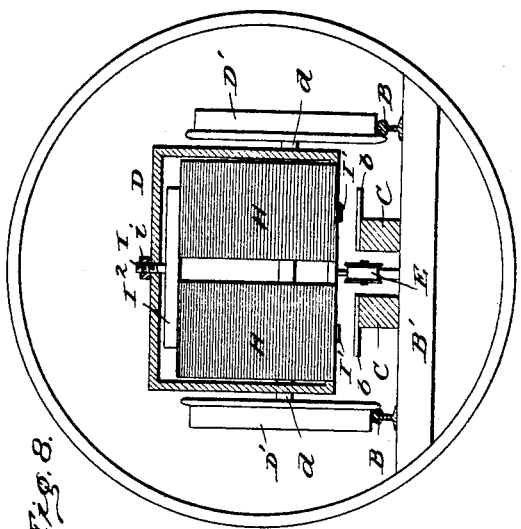
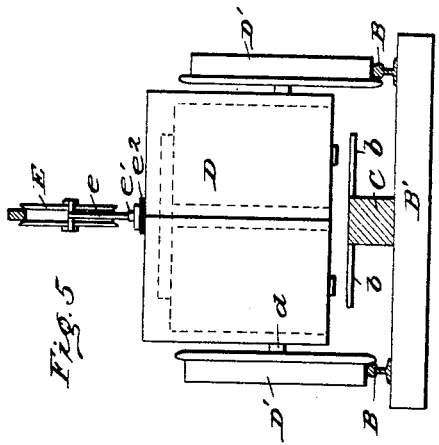
WITNESSES:
Edwin L. Bradford
Thos. S. Gatchel
INVENTOR
Harry A. Lewis
BY
V. D. Stockbridge & Son.
ATTORNEYS H. A. LEWIS.
ELECTRIC RAILWAY SYSTEM.
No. 506,124. Patented Oct. 3, 1893.
4 Sheets—Sheet 4.
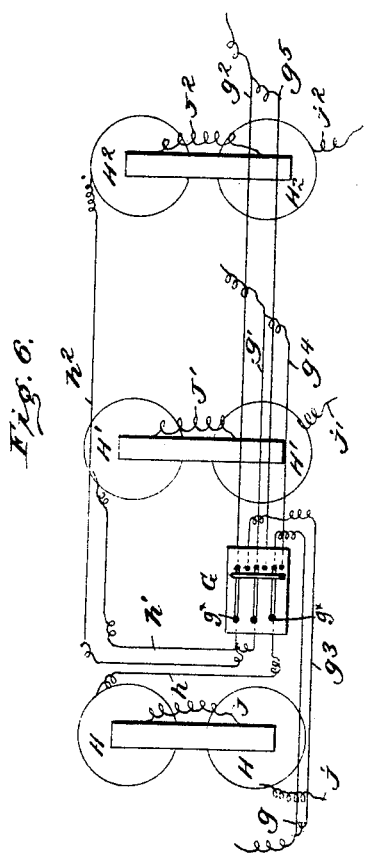
WITNESSES:
Odwin L Bradford
Theo. L. Gatchel.
INVENTOR
Harry A. Lewis.
BY
V. D. Stockbridge & Son
ATTORNEYS

UNITED STATES PATENT OFFICE.

HARRY A. LEWIS, OF NORRISTOWN, PENNSYLVANIA, ASSIGNOR OF THREE-FIFTHS TO JOHN T. DYER, OF SAME PLACE.

ELECTRIC-RAILWAY SYSTEM.

SPECIFICATION forming part of Letters Patent No. 506,124, dated October 3, 1893.

Application filed March 3, 1893. Serial No. 464,491. (No model.)

*To all whom it may concern:*

Be it known that I, HARRY A. LEWIS, a citizen of the United States, residing at Norristown, in the county of Montgomery and State of Pennsylvania, have invented certain new and useful Improvements in the Electric Propulsion of Cars; and I do hereby declare the following to be a full, clear, and exact description of the invention, such as will enable others skilled in the art to which it appertains to make and use the same.

This invention relates to certain new and useful improvements in the propulsion of cars and other bodies by the employment of electricity as the motive agent, and it has for its object among others to provide an improved and simplified arrangement of devices for this purpose, whereby I attain very high speed with the expenditure of the minimum amount of power and at small cost. I provide a trolley-bar which presents a surface to the trolley wheel in such a manner and of such a nature that said surface of contact shall be composed of alternate pieces of conducting material and of some suitable non-conducting material or insulation, the trolley wheel being designed to travel over the said bar which receives its electricity from some suitable source and from the uninsulated portions of which the trolley wheel receives its current. From the trolley wheel or wheels, the current passes through spring connections to a wire or wires which are connected with a switch, which is connected with coils which become magnets only on introduction of a current of electricity from the switch, and when they are charged these coils attract themselves toward stationary armatures arranged at intervals and thus motion is given to the car. The switch is constructed so as to connect any one of the trolley wheels with one or two of the coils to give the car a forward or backward motion, or cause the same to be motionless by the placing of the switch in a neutral position. The motor may be employed either in the open air or through continuous tubes. The coils are supported upon and carried by the body of the car thus constituting the moving parts of the motor, and the armatures are stationary and entirely separate from the car itself. The trolley-bar may be arranged above or beneath the car as may be desired.

Other objects and advantages of the invention will hereinafter appear and the novel features thereof will be specifically defined by the appended claims.

The invention is clearly illustrated in the accompanying drawings, which, with the letters of reference marked thereon, form a part of this specification, and in which—

Figure 1 illustrates in side elevation my improved motor car and track system. Fig. 2 is a plan of the same. Fig. 3 is a central, vertical longitudinal section through the same. Fig. 4 is a horizontal longitudinal section through the line 4—4 of Fig. 3, looking downward. Fig. 5 is an end elevation. Fig. 6 is a diagrammatic view showing the system of wiring, and of the switch board, required for the operation of the motor. Fig. 7 is a central, vertical longitudinal section through the device as constructed for tube work. Fig. 8 is an end elevation of the form shown in Fig. 7, within the tube.

Like letters of reference indicate like parts throughout the several views.

The principle of my invention is capable of embodiment in a variety of forms and while I have chosen to show what I at present consider the preferable form it will be understood that I do not intend to restrict myself to the details of construction herein disclosed; it may also be adapted for either tube or open air application and I have shown one form for each of such uses in the present case.

Referring now to the details of the drawings by letter, A designates the trolley-bar which is constructed and arranged to receive a current of electricity from a dynamo (not shown) located at any convenient point along the line, or in any preferred position, and composed of alternating conducting and non-conducting portions; and suitable substance or material may be employed for the different portions of the trolley-bar, but for the non-conducting portions I prefer asbestus for the reason that it is more durable and lasting. On referring to Fig. 3 the non-conducting portions of this bar will be found designated by the letter $a$ and the conducting portions by $a'$. The trolley-bar is designed to be supported in any suitable manner; overhead for open air systems, and beneath the car for tube constructions, as seen in Figs. 7 and 8.

B are the rails supported on the cross ties B', and C is a stringer or timber arranged between the rails and supported upon the cross ties as seen in Fig. 5. Upon this stringer or timber are supported a plurality of stationary armatures $b$ affixed thereto or held thereon in any suitable manner, being preferably of annealed iron and extended for some little distance in either direction as seen in Fig. 4.

D is the car of any suitable construction except as hereinafter specified, supported upon the wheels D' running on the rails and carried by the axles $d$ as seen in the various views.

E, E' and E$^2$ are the trolley wheels or conductors held against and traveling in contact with the trolley-bar; if the trolley-bar is arranged overhead of course the trolley wheels will likewise be arranged above the car, but when the trolley-bar is located beneath the car as in tube construction the trolley wheels will of necessity be arranged upon the under side of the car as seen in Figs. 7 and 8. As their construction and operation are substantially the same in both instances a description thereof in the one will suffice for both. They are each resiliently supported in contact with the trolley-bar by the spring arm $e$, and receive current by contact with the conducting portions of the trolley-bar. The spring arms are secured to the top or bottom of the car, as the case may be, by suitable means as the bolts $e'$ and are insulated by suitable insulation as shown at $e^2$. The spring arms are restricted in their movements by the vertical bolts or rods F as seen best in Fig. 1, the said bolts being insulated from the car at their points of attachment thereto and provided at their ends farthest from the car with adjusting nuts $f$ by which the pressure of the trolley wheels against the trolley-bar may be regulated at will. Each of the spring arms is connected by a wire $g$, $g'$ and $g^2$ respectively with a switch G located at any suitable place upon the car, and from the said switch run wires $h$, $h'$ and $h^2$ which are connected with the coils H in a manner which will soon be described. These coils become magnets only on introduction of a current of electricity from the switch, and when they are charged these coils attract themselves toward the stationary armatures $b$ in a manner which will soon be made apparent. The coils extend through the bottom of the car and are held suspended from the top thereof by the rods I which are screw-threaded as shown and these rods are provided with the nuts $i$ by which the height of the coils may be adjusted. The cores I' of these coils are of soft iron and extend a short distance below the bottoms of the coils as seen clearly in Fig. 3, while at the top each pair of cores is joined together by a metallic strip I$^2$, the rod I passing through the center of the strip as seen in Fig. 4.

In Fig. 6 I have shown the manner of connecting the wires with the switch and with the coils, and to this view special attention is directed for an understanding of the mode of wiring. As above stated the coil H is connected with the switch by a wire $h$, the coil H' is connected with the switch by a wire $h'$, and the coil H$^2$ by means of a wire $h^2$. The trolley-wheel E is connected with the switch by a wire $g$, the wheel E' by wire $g'$ and the wheel E$^2$ by the wire $g^2$. The trolley wheel E is further connected with the switch by a wire $g^3$, the wheel E' by another wire $g^4$ and the wheel E$^2$ by another wire $g^5$, the two sets of wires being provided, the one for forward motion of the car and the other for backward motion thereof. The coils of each pair are connected by a wire J, J' and J$^2$ respectively, and each pair of coils is also connected with the ground by a wire $j$, $j'$ and $j^2$ respectively as seen in Fig. 6.

The switch G has three positions, producing a forward movement, a backward movement, and motionless. The switch as shown in the accompanying drawings is set for the forward movement of the car, which in this case is in the direction of the arrow or toward the left hand. For this forward movement of the car the course of the electric current through the wiring and switch is as follows:— The wheel E being in contact with the trolley-bar, a current from the uninsulated or conducting portion thereof enters the wheel and passes down the spring arm $e$ and entering the wire $g$ (the wire $g^3$ being open) passes along the wire $g$ to its connection with the switch, thence through the said switch to the wire $h$, thence along said wire to the coils H, and thence through the ground wire connection through the body of the car, magnetizing the coils H which attract themselves toward the nearest armature $b$ and drawing the car forward with them. By this movement of the coils H and the car the wheel E comes in the insulated portion of the trolley-bar and thus loses its current and the wheel E' coming in contact with an uninsulated portion of the trolley-bar receives current therefrom which passes down the spring arm, to the wire $g'$ (the wire $g^4$ being open), thence along the said wire to the switch G, thence through the switch to the wire $h'$ and along the said wire to the coils H', thence to the ground wire connection through the body of the car, thus magnetizing the coils H' which attract themselves toward the nearest armatures $b$, drawing the car with them. This movement brings the wheel E' on an insulated portion of the trolley-bar thus losing its current and the wheel E$^2$ comes in contact with an uninsulated portion of the bar and receives current therefrom; the current now passes along the spring arm to the wire $g^2$, (the line $g^5$ being open,) thence along said wire $g^2$ to the switch, through the switch to the wire $h^2$ and along the said wire to the coils $H^2$, thence to the ground wire connection through the body of the car, magnetizing the coils $H^2$ which attract themselves toward the nearest armatures $b$ and drawing the car with them. This motion brings the wheel $E^2$ on an insulated portion and the wheel E on an uninsulated portion of the trolley-bar and the before described operations and movements are repeated. The wheels come in contact with and leave the uninsulated portions of the trolley-bar so rapidly as to be almost imperceptible and the consequence is a rapid continuous forward motion of the car. To reverse the motion of the car all that it is necessary to do is to move the switch which is made in three parts and pivoted at $g^\times$ from the wires $g$, $g'$ and $g^2$ onto the wires $g^3$, $g^4$ and $g^5$, thus sending the current from the wheel E to the coils $H^2$, the current from the wheel E' to the coils H, and the current from the wheel $E^2$ to the coils H', thus giving the car a backward movement, that is reverse to the direction in which it has just been described as moving, because in this case the nearest armatures are always at the right hand of the coil that is charged. When the motion of the car is to be stopped the switch is moved off all the contacts at the right.

In tube constructions such as is shown in Figs. 7 and 8 the construction and operation of parts are in all essentials the same as above described. As seen in Fig. 8 the trolley-bar is located beneath the car between the rails, and the armatures are carried by the timbers or stringers one arranged upon each side of the trolley-bar. The trolley-wheels are arranged at the bottom of the car but the connections are the same and the mode of operation is in all respects similar to the form above set forth in full. T represents the tube within which the parts are arranged.

Modifications in detail may be resorted to without departing from the spirit of the invention or sacrificing any of its advantages. Parts may be used without the whole. Some of the parts as above described will operate equally as well in connection with a modified construction of the other parts.

What I claim as new is—

1. The combination with the trolley-bar with alternating conducting and non-conducting surfaces, of a trolley-wheel mounted to move in contact with said bar, vertically-disposed coils energized from said bar, and horizontally-disposed armatures mounted to be engaged by the coils, as set forth.

2. The combination with the bar having alternating conducting and non-conducting surfaces, of a plurality of trolley-wheels mounted to travel in contact with said bar and carried by adjustable resilient supports, coils electrically connected with the wheels and energized from said bar, and horizontally-disposed fixed armatures mounted transversely to the direction of the travel and arranged to co-operate with the coils to move the car, as set forth.

3. The combination with the trolley-bar and the trolley-wheel, of a vertically-disposed adjustably-mounted coil electrically connected with the wheel, horizontally-disposed armatures stationarily mounted for co-operation with the coil a support for the coil and a switch whereby the coil and wheel may be employed for movement of the car in either direction, substantially as shown and described.

4. The combination with stationary, horizontally-disposed armatures mounted transversely to the direction of the travel, of a suspended coil having a core, and electrical connections including a resiliently supported adjustable trolley-wheel between the coil and a source of electricity, as and for the purposes specified.

5. The combination with a plurality of trolley-wheels and a like number of sets of coils, of a switch, and connections and a trolley-bar having alternating active and inactive sections, whereby either one of the sets of coils may be thrown into action before the others, as and for the purposes specified.

6. The combination with the fixed horizontally-disposed armatures mounted transversely to the direction of the travel, and the set of coils, of the cores for said coils, the strip connecting the cores, and the adjustable rod for suspending the coils passed through said strip and provided with an adjusting nut, as set forth.

In testimony whereof I affix my signature in presence of two witnesses.

HARRY A. LEWIS.

Witnesses:
LOUIS M. CHILDS,
D. FRED. CARVER.